United States Patent
Endo et al.

(10) Patent No.: US 7,829,655 B2
(45) Date of Patent: Nov. 9, 2010

(54) HEAT-SHRINKABLE POLYESTER FILM AND PROCESS FOR PRODUCTION THEREOF

(75) Inventors: Takurou Endo, Inuyama (JP);
Masayuki Haruta, Inuyama (JP);
Norimi Tabota, Inuyama (JP);
Katsuhiko Nose, Inuyama (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 12/304,531

(22) PCT Filed: Jun. 13, 2007

(86) PCT No.: PCT/JP2007/061860

§ 371 (c)(1),
(2), (4) Date: Jan. 30, 2009

(87) PCT Pub. No.: WO2007/145231

PCT Pub. Date: Dec. 21, 2007

(65) Prior Publication Data

US 2009/0270584 A1    Oct. 29, 2009

(30) Foreign Application Priority Data

Jun. 14, 2006 (JP) ............................. 2006-165212
Dec. 28, 2006 (JP) ............................. 2006-355365
Jun. 12, 2007 (JP) ............................. 2007-154874

(51) Int. Cl.
*C08G 63/00* (2006.01)
*B32B 27/06* (2006.01)

(52) U.S. Cl. ............. 528/308.1; 264/176.1; 264/210.1; 264/211.12; 264/231; 428/34.9; 428/220; 428/480

(58) Field of Classification Search ............ 264/176.1, 264/210.1, 211.12, 231; 428/34.9, 220, 480; 528/308.1
See application file for complete search history.

(56) References Cited

U.S. PATENT DOCUMENTS

| 6,939,616 | B2 * | 9/2005 | Hayakawa et al. | 428/480 |
| 6,958,178 | B2 * | 10/2005 | Hayakawa et al. | 428/34.9 |
| 7,279,204 | B2 * | 10/2007 | Ito et al. | 428/34.9 |
| 2003/0165658 | A1 * | 9/2003 | Hayakawa et al. | 428/98 |
| 2005/0236731 | A1 * | 10/2005 | Hayakawa et al. | 264/176.1 |

FOREIGN PATENT DOCUMENTS

| JP | 8-244114 A | 9/1996 |
| JP | 2005-194466 A | 7/2005 |
| JP | 2006-181899 A | 7/2006 |
| JP | 2007-016120 A | 1/2007 |
| JP | 2007-056156 A | 3/2007 |
| KR | 10-0538200 B1 | 12/2005 |
| WO | WO 2005/012403 A1 | 2/2005 |

* cited by examiner

*Primary Examiner*—Terressa M Boykin
(74) *Attorney, Agent, or Firm*—Leydig, Voit & Mayer, Ltd.

(57) ABSTRACT

In the heat-shrinkable polyester film of the present invention, the main shrinkage direction is the longitudinal direction. In addition, the hot-water heat shrinkage ratios in the longitudinal direction and the width direction when the film is treated in hot water at 90° C. for 10 seconds, the refractive indexes in the longitudinal direction and the width direction and the natural shrinkage ratio after aging at 40° C. and 65% RH for 700 hours or more are each controlled in predetermined ranges. The heat-shrinkable polyester film of the present invention is manufactured by stretching an unstretched film at a ratio of 2.5 times or more and 6.0 times or less in the width direction at a temperature of Tg+5° C. or more and Tg+40° C. or less, passing the film in an intermediate zone that does not execute an active heating operation, heat-treating the film at a temperature of 100° C. or more and 170° C. or less over a period of 1.0 second or more and 10.0 seconds or less, cooling the film to a surface temperature of 30° C. or more and 70° C. or less, stretching the film at a ratio of 2.0 times or more and 7 times or less in the longitudinal direction at a temperature of Tg+5° C. or more and Tg+80° C. or less, and subsequently cooling the film at a cooling rate of 30° C./second or more and 70° C./second or less to a surface temperature of the film of 45° C. or more and 75° C. or less.

19 Claims, 1 Drawing Sheet

HEAT-SHRINKABLE POLYESTER FILM AND PROCESS FOR PRODUCTION THEREOF

TECHNICAL FIELD

The present invention relates to a heat-shrinkable polyester film and a manufacturing method thereof specifically to a heat-shrinkable polyester film suitable for label applications and a manufacturing method thereof.

BACKGROUND ART

Recently, heat-shrinkable plastic films made from a variety of resins are widely used for applications such as external packaging for the appearance improvement of packaged goods, packaging for avoiding direct collision of contents, and label packaging for both protection of glass bottles or plastic bottles and indication of commercial products. Among these heat-shrinkable plastic films, stretched films made from polyvinyl chloride resin, polystyrene resin, polyester resin, or the like are used for the purpose of labeling, cap sealing or assembling packaging in various containers such as polyethylene terephthalate (PET) containers, polyethylene containers, and glass containers.

However, although excellent in shrinkage characteristics, polyvinyl chloride films pose problems of, in addition to low heat resistance, generating a hydrogen chloride gas during incineration, generating dioxins, and the like. In addition, use of polyvinyl chloride resin films as shrink labels for PET containers and the like also causes a problem in that a label has to be separated from a container upon recycling the container. On the other hand, while good in finished appearance after shrinkage, polystyrene films are poor in solvent resistance, and thus suffering a disadvantage in that an ink of a special composition has to be used upon printing. Additionally, polystyrene films need to be incinerated at high temperature and cause a problem of generating a large amount of black smoke along with foul smells during incineration.

Therefore, polyester films exhibiting high heat resistance, easy to incinerate and excellent in solvent resistance have been widely utilized as a shrink label. The amount of use of polyester films tends to increase as the distribution amount of PET containers increases.

Moreover, usual heat-shrinkable polyester films that are greatly shrunk in the width direction are widely utilized. In such a case, heat-shrinkable polyester films the width direction of which is the main shrinkage direction undergo drawing at a high ratio to the width direction in order to exhibit shrinkage characteristics in the width direction. However, only drawing at a low ratio is often applied to the longitudinal direction orthogonal to the main shrinkage direction and there are also unstretched heat-shrinkable polyester films. Films to which drawing at a low ratio is only applied to the longitudinal direction or films which is stretched only in the width direction have a defect of being poor in longitudinal mechanical strength.

In addition, a label for a bottle should be attached to the bottle in a circular shape and then circumferentially heat-shrunk. Hence, when a heat-shrinkable film that heat-shrinks to the width direction is attached as a label, a circular body should be formed such that the width direction of the film may become the circumferential direction and then the circular body should be attached onto the bottle by cutting the circular body into pieces each having a given length. Therefore, it is difficult to attach a label made from a heat-shrinkable film that heat-shrinks in the width direction onto a bottle at a high speed. Thus, recently, films that can be wound directly around the circumference of a bottle and attached from a film roll (so-called, wraparound) and heat-shrink in the longitudinal direction are demanded. Additionally, recently, a wrapping method is developed that involves covering the surrounding of a one-side opened synthetic resin container such as a lunch box with a band-like film to thereby keep the container enclosed. Films that shrink in the longitudinal direction are suitable also for such packaging applications. Accordingly, demands for films that shrink in the longitudinal direction are expected to increase rapidly in the future.

In order to eliminate the disadvantage of mechanical strength in a direction orthogonal to the main shrinkage direction as described above and in order to exhibit a function of shrinking in the longitudinal direction, a heat-shrinkable polyester film is known that is made by stretching an unstretched film 2.0 to 5.0 times respectively in the longitudinal direction (also called a lengthwise direction) and the width direction (also called a transverse direction), and then re-stretching 1.1 times or more in the longitudinal direction to thereby exhibit shrinkability as well as control both the Young's modulus in the longitudinal direction and the Young's modulus in the width direction to be a given value or more (Patent Document 1).

Patent Document 1: Japanese Unexamined Patent Publication No. H08-244114

DESCRIPTION OF THE SYMBOL

F—Film

DESCRIPTION OF THE INVENTION

Figure 1:
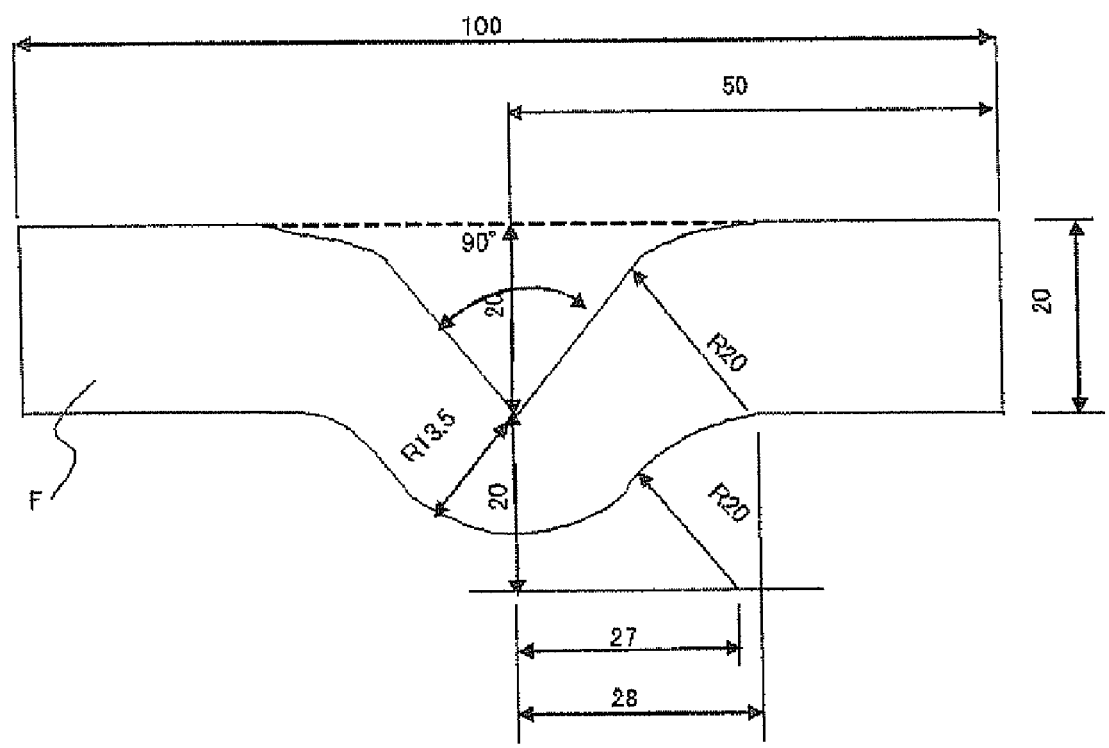
FIG. 1 is an explanatory view showing a shape of a test piece in the measurement of right angle tear strength (wherein, the unit of length in the drawing for each portion of the test piece is mm).

Problems to be Solved by the Invention

However, although the heat-shrinkable polyester film of the patent document 1 described above is good in the mechanical strength in the longitudinal direction and the width direction, various properties when the film is made into an industrial product and properties used as a package are not necessarily sufficient. In other words, when the present inventors replicated an experiment using a pilot plant (film width=1.5 m) in order to obtain a heat-shrinkable polyester film of the patent document 1, the resulting heat-shrinkable polyester film of the patent document 1 exhibited some mechanical strength in the longitudinal direction and the width direction. However, the natural shrinkage ratio of the film was large when the film was left at normal temperature over a fixed period and thus, disadvantages that the produced roll-formed film is tightened after being wound and that the film roll is easily wrinkled were found. In addition, the heat-shrinkable polyester film obtained by the above replication was found to be poor in tear properties (so-called perforated line openability) when being torn along a perforated line orthogonal to the main shrinkage direction. Moreover, shrinkability in the longitudinal direction that is the main shrinkage direction has been found to be not necessarily sufficient, and thus the film cannot be applied to a wide variety of packages.

An object of the present invention is to provide a heat-shrinkable polyester film that overcomes the problems owned by the above heat-shrinkable polyester film of the patent document 1, exhibits high mechanical strength in a width direction orthogonal to the main shrinkage direction as well as causes no tightening after winding in a roll-formed film produced therefrom, hardly has wrinkles in the film roll and is good in perforated line openability. Furthermore, another object is to provide a heat-shrinkable polyester film that is high in shrinkability in the longitudinal direction that is the main shrinkage direction and can also be applied to applications that demand a high shrinkage ratio.

Means for Solving the Problems

In the present invention, an invention described in claim 1 is a heat-shrinkable polyester film having ethylene terephthalate as a main constituent and containing 10% by mole or more of one or more kind(s) of monomer components) that may become amorphous components in all polyester resin components, as well as being formed in a long shape with a constant width, and a main shrinkage direction thereof is a longitudinal direction, and the invention is characterized by satisfying the following requirements (1) to (4):

(1) the hot-water heat shrinkage ratio in a longitudinal direction is 15% or more and 80% or less when the film is treated in hot water at 90° C. for 10 seconds;

(2) the hot-water heat shrinkage ratio in a width direction orthogonal to the longitudinal direction is 0% or more and 17% or less when the film is treated in hot water at 90° C. for 10 seconds;

(3) the refractive indexes in the longitudinal direction and the width direction are both 1.570 or more and 1.620 or less; and (4) the natural shrinkage ratio after aging at 40° C. and 65% RH for 700 hours is 0.05% or more and 1.5% or less.

An invention described in claim 2 is, in the invention described in claim 1, characterized in that the hot-water heat shrinkage ratio in the longitudinal direction is 15% or more and less than 40% when the film is treated in hot water at 90° C. for 10 seconds, the refractive index in the longitudinal direction is 1.570 or more and 1.590 or less, and the refractive index in the width direction is 1.570 or more and 1.620 or less.

An invention described in claim 3 is, in inventions described in claim 1 or 2, characterized in that the main component of monomer(s) that may become amorphous components in all the polyester resin components is any one of neopentyl glycol, 1,4-cyclohexane dimethanol and isophthalic acid.

An invention described in claim 4 is, in inventions described in any of claims 1 to 3, characterized in that the Elmendorf ratio is 0.15 or more and 1.5 or less when the Elmendorf tear loads in the longitudinal direction and the width direction are measured after the film is shrunk by 10% in the longitudinal direction in hot water at 80° C.

An invention described in claim 5 is, in inventions described in any one of claims 1 to 4, characterized in that the right angle tear strength in the width direction per unit thickness after the film is shrunk by 10% in the longitudinal direction in hot water at 80° C. is 100 N/mm or more and 300 N/mm or less.

An invention described in claim 6 is a manufacturing method for continuously manufacturing the heat-shrinkable polyester film according to any of claims 1 to 5, characterized by stretching an unstretched film at a ratio of 2.5 times or more and 6.0 times or less to the width direction at a temperature of Tg+5° C. or more and Tg+40° C. or less while holding both ends in the width direction using a clip within a tenter, passing the film in an intermediate zone that does not execute an active heating operation, heat-treating the film at a temperature of 100° C. or more and 170° C. or less over a period of 1.0 second or more and 10.0 seconds or less, cooling the film to a surface temperature of 30° C. or more and 70° C. or less, stretching the film at a ratio of 2.0 times or more and 7 times or less in the longitudinal direction at a temperature of Tg+5° C. or more and Tg+80° C. or less, and subsequently cooling the film at a cooling rate of 30° C./second or more and 70° C./second or less to a surface temperature of the film of 45° C. or more and 75° C. or less.

Effects of the Invention

The heat-shrinkable polyester film of the present invention exhibits high mechanical strength in a width direction orthogonal to the main shrinkage direction as well as causes no tightening after winding in a roll-formed film produced therefrom, hardly has wrinkles in the film roll and is good in perforated line openability. Additionally, the shrinkability in the longitudinal direction that is the main shrinkage direction is high. Therefore, the heat-shrinkable polyester film of the present invention can be suitably used as a label of a container such as a bottle, can be attached onto a container such as a bottle very efficiently within a short time and also can show a good finish with extremely few wrinkles and shrinkage shortages when heat-shrunk after attachment. Additionally, the attached label exhibits very good perforated line openability.

BEST MODE FOR CARRYING OUT THE INVENTION

Dicarboxylic acid components constitute a polyester to be used in the present invention can include aromatic dicarboxylic acids such as terephthalic acid, isophthalic acid, naphthalenedicarboxylic acid and orthophthalic acid, aliphatic dicarboxylic acids such as adipic acid, azelaic acid, sebacic acid and decane dicarboxylic acid, alicyclic dicarboxylic acids, and the like.

When an aliphatic dicarboxylic acid (e.g., adipic acid, sebacic acid, decane dicarboxylic acid, or the like) is contained, the content is preferably less than 3% by mole. The heat-shrinkable polyester film obtained by using a polyester that contains 3% by mole or more of these aliphatic dicarboxylic acids becomes insufficient in film stiffness upon high speed attachment.

Moreover, a polybasic carboxylic acid that is tribasic or more (e.g., trimellitic acid, pyromellitic acid, an anhydride thereof, or the like) is not preferably contained. Heat-shrinkable polyester films obtained by using polyesters that contain these polybasic carboxylic acids become difficult to attain a required high shrinkage ratio.

The diol components constitute a polyester to be used in the present invention can include aliphatic diols such as ethylene glycol, 1,3-propanediol, 1,4-butanediol, neopentyl glycol and hexanediol, alicyclic diols such as 1,4-cyclohexane dimethanol, aromatic diols such as bisphenol A, and the like.

The polyester used for the heat-shrinkable polyester film of the present invention is preferably a polyester which is made to contain one or more kind(s) among cyclic diols such as 1,4-cyclohexane dimethanol and diols having 3 to 6 carbon atoms (e.g., 1,3-propanediol, 1,4-butanediol, neopentyl glycol, hexanediol, and the like) and in which the glass transition point (Tg) is controlled to be from 60 to 80° C.

In addition, in the polyester used for the heat-shrinkable polyester film of the present invention, the total of one or more kind(s) of monomer component(s) that may become amorphous components) in 100% by mole of polyhydric alcohol components) in the total of the polyester resins needs to be 10% by mole or more, is preferably 15% by mole or more, more preferably 17% by mole or more, particularly preferably 20% by mole or more. Here, the monomer(s) that may become amorphous component(s) can include, for example, neopentyl glycol, 1,4-cyclohexanediol and isophthalic acid.

A diol having 8 or more carbon atoms (e.g., octanediol or the like) or a polyhydric alcohol that is trihydric or more (e.g., trimethylolpropane, trimethylolethane, glycerol, diglycerol, or the like) is preferably not contained in a polyester used for the heat-shrinkable polyester film of the present invention Heat-shrinkable polyester films obtained by using polyesters that contain these diols or polyhydric alcohols become difficult to attain a necessary high shrinkage ratio.

Additionally, in the heat-shrinkable polyester film of the present invention, when treated for 10 seconds at 90° C. in hot water in an unloaded state, the longitudinal heat shrinkage ratio of the film calculated by Equation 1 below (i.e., hot-water heat shrinkage ratio at 90° C.) needs to be 15% or more and 80% or less from the lengths before and after shrinkage.

$$\text{Heat shrinkage ratio} = \{(\text{length before shrinkage} - \text{length after shrinkage})/\text{length before shrinkage}\} \times 100(\%) \quad \text{Equation 1}$$

When the hot-water heat shrinkage ratio in the longitudinal direction at 90° C. is less than 15%, the amount of shrinkage is small when the film is used as a label. Because of this, the case is not preferred because wrinkles and sags are generated in the label after heat shrinkage. Oppositely, when the hot-water heat shrinkage ratio in the longitudinal direction at 90° C. exceeds 80%, distortion in shrinkage is liable to be generated during heat shrinkage when the film is used as a label or so-called "jumping up" may be generated, and therefore the case is not preferred. In addition, the lower limit of the hot-water heat shrinkage ratio in the longitudinal direction at 90° C. is preferably 20% or more, more preferably 25% or more, particularly preferably 30% or more. Additionally, the upper limit of the hot-water heat shrinkage ratio in the longitudinal direction at 90° C. is preferably 75% or less, more preferably 70% or less, particularly preferably 65% or less.

Moreover, when the film of the present invention is fit onto a bottle (attach the film to a circumference of a bottle or the like) after the cylindrical label in which the circumferential direction is the main shrinkage direction is formed in advance, the hot-water heat shrinkage ratio in the longitudinal direction at 90° C. is preferably 40% or more and 80% or less. In the case where, as mentioned above, a cylindrical label in which the circumferential direction is the main shrinkage direction is formed in advance and then is fit onto a bottle, the amount of shrinkage is small when the hot-water heat shrinkage ratio in the longitudinal direction at 90° C. is less than 40%. Because of this, the case is not preferred since wrinkles and sags are generated in the label after heat shrinkage. Oppositely, when the hot-water heat shrinkage ratio in the longitudinal direction at 90° C. exceeds 80%, distortion in shrinkage is liable to be generated during heat shrinkage when the film is used as a label or so-called "jumping up" may be generated, and therefore the case is not preferred. In addition, in the case where a cylindrical label in which the circumferential direction is the main shrinkage direction is formed in advance and then is fit onto a bottle, the lower limit of the hot-water heat shrinkage ratio in the longitudinal direction at 90° C. is preferably 45% or more, more preferably 50% or more, particularly preferably 55% or more. Additionally, the upper limit of the hot-water heat shrinkage ratio in the longitudinal direction at 90° C. is preferably 75% or less, more preferably 70% or less, particularly preferably 65% or less. Hereinafter, applications such as a cylindrical body fitting to which is suitable a film in which the hot-water heat shrinkage ratio in the longitudinal direction at 90° C. is 40% or more and 80% or less may be called high shrinkage applications.

When the film of the present invention is directly wound around a bottle from the film roll and attached by a wrap-around system, the hot-water heat shrinkage ratio in the longitudinal direction at 90° C. is preferably 15% or more and less than 40%. When the hot-water heat shrinkage ratio in the longitudinal direction at 90° C. is less than 15%, the amount of shrinkage is small. On account of this, the case is unpreferred since wrinkles and sags are generated during heat shrinking after the film is wound as a label by a trunk wrap system. Oppositely, when the hot-water heat shrinkage ratio in the longitudinal direction at 90° C. is 40% or more, shrinkage distortion is liable to be generated during heat shrinkage after the film is wound as a label by a trunk wrap system or so-called "jumping up" may be generated, and therefore the case is not preferred. In addition, the lower limit of the hot-water heat shrinkage ratio in the longitudinal direction at 90° C. is preferably 17% or more, more preferably 19% or more, particularly preferably 21% or more. Additionally, the upper limit of the hot-water heat shrinkage ratio in the longitudinal direction at 90° C. is preferably 38% or less, more preferably 36% or less, particularly preferably 34% or less. Hereinafter, the application as mentioned above may be called a wrap-around application.

Moreover, in the heat-shrinkable polyester film of the present invention, when treated for 10 seconds at 90° C. in hot water in an unloaded state, the hot-water heat shrinkage ratio of the film in the width direction calculated by Equation 1 above needs to be 0% or more and 17% or less.

When the hot-water heat shrinkage ratio in the width direction at 90° C. is less than 0%, the case is unpreferred since a good shrinkage appearance cannot be obtained when the film is used as a label of a bottle. Oppositely, when the hot-water heat shrinkage ratio at 90° C. exceeds 17%, distortion in shrinkage is liable to be generated during heat shrinkage when the film is used as a label, and therefore the case is not preferred. The upper limit of the width hot-water heat shrinkage ratio in the width direction at 90° C. is preferably 15% or less, more preferably 14% or less, still more preferably 13% or less, particularly preferably 12% or less, most preferably 11% or less. The lower limit of the hot-water heat shrinkage ratio in the width direction at 90° C. is thought to be about 0%, considering the essential properties of the polyester resin that is a starting material.

When the heat-shrinkable polyester film of the present invention is shrunk by 10% in hot water at 80° C. in the longitudinal direction and then the right angle tear strength in the width direction per unit thickness is evaluated by the following method, its right angle tear strength in the width direction is preferably 100 N/mm or more and 300 N/mm or less.

[Method of Measuring Right Angle Tear Strength]

After the film is shrunk by 10% in hot water adjusted to 80° C. in the longitudinal direction, the film is sampled as a test piece of a given size according to JIS-K-7128. Thereafter, both ends of the test piece are gripped with a universal tensile strength tester and then the strength at the tensile fracture in the width direction of the film is measured at a tension rate of 200 mm/minute. In addition, the right angle tear strength per unit thickness is calculated by using Equation 2 below.

$$\text{Right angle tear strength} = \text{strength at tensile fracture} \div \text{thickness} \quad \text{Equation 2}$$

When the right angle tear strength after the film is shrunk by 10% in hot water at 80° C. in the longitudinal direction is less than 100 N/mm, a situation in which the film is easily torn by an impact such as falling during transportation is possibly caused when the film is used as a label, whereby the case is unpreferred. Oppositely, when the right angle tear strength exceeds 300 N/mm, the case is unpreferred because cuttability (easiness to tear) in an initial stage when the label is torn becomes defective. The lower limit of the right angle tear strength is preferably 125 N/mm or more, more preferably 150 N/mm or more, particularly preferably 175 N/mm or more. The upper limit of the right angle tear strength is preferably 275 N/mm or less, more preferably 250 N/mm or less, particularly preferably 225 N/mm or less.

When the heat-shrinkable polyester film of the present invention is shrunk by 10% in hot water at 80° C. in the longitudinal direction and then the Elmendorf tear loads in the longitudinal direction and the width direction are evaluated by the following method, the Elmendorf ratio that is the ratio of these Elmendorf tear loads is preferably 0.15 or more and 1.5 or less

[Method of Measuring Elmendorf Ratio]

The film is attached to a rectangular frame having a given length in a preliminarily loosened state (i.e., both ends of the film are held by the frame). Then, the film is shrunk by 10% in the longitudinal direction by immersing the film in hot water at 80° C. for about 5 seconds until the loosened film comes into a state of tension in the frame (until the sag is lost). Thereafter, the Elmendorf tear loads in the longitudinal direction and the width direction of the film are measured according to JIS-K-7128 and then the Elmendorf ratio is calculated using Equation 3 below.

Elmendorf ratio=Elmendorf tear load in the longitudinal direction÷Elmendorf tear load in the width direction     Equation 3

When the Elmendorf ratio is less than 0.15, the case is unpreferred since the film is not easy to tear straight along the perforated line when used as a label. To the contrary, when the Elmendorf ratio exceeds 1.5, the label is easy to tear in a position shifted from the perforated line, whereby the case is unpreferred. The lower limit of the Elmendorf ratio is preferably 0.20 or more, more preferably 0.25 or more, particularly preferably 0.3 or more. The upper limit of the Elmendorf ratio is preferably 1.4 or less, more preferably 1.3 or less, particularly preferably 1.2 or less.

In the heat-shrinkable polyester film of the present invention, the natural shrinkage ratio after aging for 700 hours at 40° C. and 65% RH needs to be 0.05% or more and 1.5% or less. The natural shrinkage ratio can be calculated by using Equation 4 below.

Natural shrinkage ratio={(length prior to aging-length after aging)/length prior to aging}×100(%)     Equation 4

When the natural shrinkage ratio exceeds 1.5%, where a product wound up in a roll shape is kept, tightening after winding is generated and thus the film roll is liable to be wrinkled, so that the case is unpreferred. In addition, the smaller the natural shrinkage ratio is, the more preferable it is. However, the lower limit is thought to be about 0.05% in terms of the measurement precision. The natural shrinkage ratio is preferably 1.3% or less, more preferably 1.1% or less, particularly preferably 1.0% or less.

In the heat-shrinkable polyester film of the present invention, the refractive index in the longitudinal direction needs to be 1.570 or more and 1.620 or less. When the refractive index in the longitudinal direction exceeds 1.620, the case is unpreferred since solvent adhesion property is deteriorated when a label is made from the film. Oppositely, when the refractive index is less than 1.570, the case is unpreferred since the cuttability is deteriorated when a label is made from the film. The upper limit of the refractive index in the longitudinal direction is preferably less than 1.600, preferably 1.595 or less, more preferably 1.593 or less, particularly preferably 1.590. On the other hand, the lower limit of the refractive index in the longitudinal direction is preferably 1.575 or more. Additionally, in high shrinkage applications, the lower limit of the refractive index in the longitudinal direction is preferably 1.580 or more, more preferably 1.583 or more, particularly preferably 1.585 or more. Moreover, when the film of the present invention is directly wound around a bottle from the film roll and attached by the wraparound system, the refractive index in the longitudinal direction is preferably 1.570 or more and 1.590 or less. In wraparound applications, the upper limit of the refractive index in the longitudinal direction is preferably 1.587 or less, particularly preferably 1.585 or less.

In the heat-shrinkable polyester film of the present invention, the refractive index in the width direction needs to be 1.570 or more and 1.620 or less. When the refractive index in the width direction exceeds 1.620, the case is unpreferred since solvent adhesion property is deteriorated when a label is made from the film. Oppositely, when the refractive index is less than 1.570, the case is unpreferred since the cuttability is deteriorated when a label is made from the film. The upper limit of the refractive index in the width direction is preferably 1.610 or less, more preferably 1.600 or less, still more preferably 1.595 or less. The lower limit of the refractive index in the width direction is preferably 1.575 or more, more preferably 1.580 or more. In high shrinkage applications, the upper limit of the refractive index in the width direction is preferably 1.590 or less, more preferably 1.588 or less, particularly preferably 1.586 or less. When the film of the present invention is directly wound around a bottle from the film roll and attached by the wraparound system, the upper limit of the refractive index in the width direction is preferably 1.610 or less and more preferably 1.605 or less.

Meanwhile, in the present invention, the maximum value of the heat shrinkage stress in the longitudinal direction of the film is preferably 2.5 (MPa) or more and 20 (MPa) or less. When the maximum value of the heat shrinkage stress in the longitudinal direction of the film is less than 2.5 (MPa), if the film is attached as a label onto a container such as a PET bottle and heat-shrunk, the label rotates in conjunction with the cap when the cap of the PET bottle is opened, leading to a situation in which the openability of the cap is deteriorated can be caused, whereby the case is unpreferred. When the maximum value of the heat shrinkage stress in the longitudinal direction of the film is too low, shrinkage shortage is caused during heat shrinkage, so that a good appearance cannot be obtained. The lower limit of the maximum value of the heat shrinkage stress in the longitudinal direction of the film is more preferably 3.0 (MPa) or more, particularly preferably 3.5 (MPa) or more. Oppositely, when the maximum value of the heat shrinkage stress exceeds 20 (MPa), the shrinking speed becomes high and the film is liable to be wrinkled. The upper limit of the maximum value of the heat shrinkage stress in the longitudinal direction of the film is more preferably 19 (MPa) or less, particularly preferably 18 (MPa) or less.

For a good maintenance of cap openability for high shrinkage applications, the lower limit of the maximum value of the heat shrinkage stress in the longitudinal direction of the film is more preferably 6 (MPa) or more, still more preferably 7 (MPa) or more, particularly preferably 8 (MPa) or more.

For wraparound applications, shrinkage distortion during heat shrinking after trunk wrapping is liable to occur, and therefore the upper limit of the maximum value of the heat shrinkage stress in the longitudinal direction of the film is preferably 7 MPa or less. The upper limit is more preferably 6.5 MPa or less, still more preferably is 6.0 MPa or less, particularly preferably 5.5 MPa or less.

In the heat-shrinkable polyester film of the present invention, the solvent adhesion strength is preferably 4 (N/15 mm) or more. When the solvent adhesion strength is less than 4 (N/15 mm), the label is liable to peel off from the solvent adhesion portion after the label heat-shrinks, so that the case is unpreferred. The solvent adhesion strength is more preferably 4.5 (N/15 mm) or more, particularly preferably 5 (N/15 mm) or more. In particular, for high shrinkage applications, the above properties are preferably satisfied.

In addition, in the heat-shrinkable polyester film of the present invention, the thickness unevenness in the longitudinal direction is preferably 10% or less. When the value of the thickness unevenness in the longitudinal direction exceeds 10%, printing unevenness are liable to be generated upon printing during label formation, or shrinkage unevenness after heat shrinking are prone to be generated, whereby the case is unpreferred. The thickness unevenness in the longitudinal direction is more preferably 8% or less, more preferably 6% or less.

The heat shrinkage ratio, the maximum value of the heat shrinkage stress, the solvent adhesion strength and the thickness unevenness in the longitudinal direction of the film can be attained using the preferred film composition as described above in conjunction with a preferred manufacturing method as described below.

Moreover, it is preferable that no peak of the endothermic curve during melting point measurement by differential scanning calorimetry (DSC) is detected for the heat-shrinkable polyester film of the present invention. The peak of the endothermic curve during melting point measurement tends to hardly appear by making a polyester constituting the film amorphous. High amorphization to an extent that no peak of the endothermic curve during melting point measurement is exhibited improves the solvent adhesion strength as well as the heat shrinkage ratio and the maximum value of the heat shrinkage stress and makes them be easily controlled within the above-described preferred ranges.

The thickness of the heat-shrinkable polyester film of the present invention is not particularly limited and is preferably from 10 to 200 μm, more preferably from 20 to 100 μm, as a heat-shrinkable film for labels.

The heat-shrinkable polyester film of the present invention can be obtained by melt-extruding a polyester starting material described above by an extruder to form an unstretched film and then biaxially stretching and heat-treating the unstretched film by the following methods.

When a raw material resin is melt-extruded, a polyester starting material is preferably dried using a dryer such as a hopper dryer or a paddle dryer or using a vacuum dryer. The polyester starting material is dried in such a manner and then molten at a temperature of from 200 to 300° C. and extruded in a film form utilizing an extruder. Upon such extrusion, an existing arbitrary method such as a T-die method or a tubular method can be adopted.

Then, an unstretched film can be obtained by quenching the sheet-like molten resin after extrusion. As the method of quenching a molten resin, a method of casting a molten resin onto a revolving drum from a head and quenching and solidifying the resin to obtain a substantially unoriented resin sheet can be suitably adopted.

In addition, the resulting unstretched film is stretched in the width direction under given conditions, as described below. Thereafter, the film is heat-treated once and then stretched in the longitudinal direction under given conditions. The heat-shrinkable polyester film of the present invention can be obtained by quenching the film after the longitudinal stretching. Hereinafter, preferred biaxial stretching and heat treatment methods for obtaining the heat-shrinkable polyester film of the present invention will be described in detail in consideration of the difference between the methods of the present invention and the conventional biaxial stretching and heat treatment methods for a heat-shrinkable polyester film.

[Preferred Stretching and Heat Treatment Methods for Heat-Shrinkable Polyester Film]

A usual heat-shrinkable polyester film is manufactured by stretching an unstretched film in a direction in which the film is to be shrunk. Demands for a heat-shrinkable polyester film that shrinks in the longitudinal direction have been high so far. However, a wide film cannot be manufactured only by stretching an unstretched film in the longitudinal direction. Thus, the productivity is poor and a film with a good thickness evenness cannot be manufactured. Moreover, adoption of a method for stretching a film in the longitudinal direction in advance and then stretching the film in the width direction produces a film that needlessly shrinks in the width direction or a film in which the amount of shrinkage in the longitudinal direction is insufficient. As described above, Japanese Unexamined Patent Publication No. H08-244114 describes a method of stretching an unstretched film in the order of lengthwise, transverse and lengthwise directions under given conditions for the improvement of mechanical properties in the longitudinal direction. However, according to the replication using a pilot plant by the present inventors, the resulting film produced by the method was large in natural shrinkage ratio, generated wrinkles in the longitudinal direction in the film roll produced and was also poor in perforated line openability. In addition, it has been ascertained that a film with high shrinkability in the longitudinal direction that is the main shrinkage direction cannot be obtained. Additionally, it has also been ascertained that, when the lengthwise stretching ratio (the lengthwise stretching ratio in the first stage or the lengthwise stretching ratio in the second stage) is increased for improvement of shrinkability in the longitudinal direction, continuous stable manufacturing is difficult to carry out due to frequent film rupture during the final longitudinal stretching.

The present inventors have considered that, to finally increase the amount of shrinkage in the longitudinal direction, a method of simply stretching a film in the width direction and then stretching the film in the longitudinal direction is advantageous as compared with a disadvantageous method of biaxially stretching a film in the longitudinal direction and the width direction and then stretching the film in the longitudinal direction as in Japanese Unexamined Patent Publication No. H08-244114. In addition, the inventors have diligently studied that, in the method of stretching a film in the width direction and then stretching the film in the longitudinal direction (hereinafter, simply called the transverse-lengthwise stretching method), how the hot-water shrinkage ratio in the longitudinal direction, the natural shrinkage ratio and the perforated line openability of the film are changed depending on conditions in each stretching process. As a result, the inventors have found that, during the manufacture of a film by the transverse-lengthwise stretching method, the amount of shrinkage in the longitudinal direction can be increased and the film can be continuously and stably manufactured by applying the following techniques. Moreover, the inventors have ascertained that, in addition to the above results, the secondary surprising effects are produced that the natural shrinkage ratio of a film becomes small and the film roll after production tends to be hardly wrinkled and also that the perforated line openability of the film markedly becomes good when the following techniques are applied. In addition, the present inventors have come to contrive the present invention on the basis of those findings.

(1) Control of the shrinkage stress after stretching to the width direction (2) Interruption of the heating between the stretching in the width direction and the intermediate heat treatment (3) Trimming of the film end prior to the stretching in the longitudinal direction (4) Control of the cooling rate of the film after longitudinal stretching Hereinafter, each technique described above will be sequentially described.

(1) Control of Shrinkage Stress after Stretching to Width Direction

The manufacturing of a film according to the transverse-lengthwise stretching method of the present invention requires stretching an unstretched film in the width direction and then heat-treating the film at a temperature of 100° C. or more and less than 170° C. over a period of 1.0 second or more and 10.0 seconds or less (hereinafter, called the intermediate heat treatment). Execution of such an intermediate heat treatment makes it possible to obtain a film that is good in perforated line cuttability and does not generate shrinkage unevenness when the film is made into a label. The reason why a film that is good in perforated line cuttability and does not generate shrinkage unevenness can be obtained by executing a specific intermediate heat treatment after transverse stretching in such a manner is not clear. However, this seems to be because the shrinkage stress in the width direction can be decreased while the molecular orientation in the width direction is made to remain to some extent by applying the specific intermediate heat treatment. The lower limit of the heat treatment temperature is preferably 110° C. or more, more preferably 115° C. or more. Additionally, the upper limit of the heat treatment temperature is preferably 165° C. or less, more preferably 160° C. or less. On the other hand, the time of heat treatment needs to be controlled within the range of 1.0 second or more and 10.0 seconds or less depending on the raw material composition.

The stretching in the width direction of an unstretched film needs to be executed while the both ends in the width direction is held by a clip in a tenter such that the temperature is Tg+5° C. or more and Tg+40° C. or less and that the ratio is 2.5 times or more and 6.0 times or less. When the stretching temperature falls below Tg+5° C., the rupture at stretching is liable to occur, so that the case is unpreferred. To the contrary, when the temperature exceeds Tg+40° C., the thickness unevenness in the width direction deteriorates, so that the case is unpreferred. The lower limit of the transverse stretching temperature is preferably Tg+10° C. or more, more preferably Tg+15° C. or more. Additionally, the upper limit of the transverse stretching temperature is preferably Tg+35° C. or less, more preferably Tg+30° C. or less. When the stretching ratio in the width direction falls below 2.5 times, not only the productivity is poor but also the thickness unevenness in the width direction deteriorates, so that the case is unpreferred. To the contrary, when the stretching ratio exceeds 6.0 times, the rupture is liable to occur at stretching and also a large energy and a large scale device are required for relaxation and thus the productivity deteriorates, so that the case is unpreferred. In addition, the lower limit of the transverse stretching ratio is preferably 3.0 times or more, more preferably 3.5 times or more. Additionally, the upper limit of the transverse stretching ratio is 5.5 times or less, more preferably 5.0 times or less.

(2) Interruption of Heating Between Stretching in Width Direction and Intermediate Heat Treatment In the manufacture of a film by the transverse-lengthwise stretching method of the present invention, as described above, an intermediate heat treatment needs to be performed after transverse stretching. Between these transverse stretching and intermediate heat treatment, the film needs to be passed through an intermediate zone that does not execute an active heating operation over a time period of 0.5 second or more and 3.0 seconds or less. In other words, when the production cost is considered, the transverse stretching and the intermediate heat treatment are preferably carried out in one and the same tenter. In manufacturing of the film of the present invention, an intermediate zone is preferably disposed between the transverse stretching zone and the heat treatment zone within the tenter. Additionally, in the intermediate zone, when a strip of paper is hung down without passing a film, hot air from the stretching zone and the heat treatment zone is preferably interrupted such that the paper strip hangs down almost completely in the lengthwise direction. In the manufacture of the film of the present invention, the film after transverse stretching is preferably introduced into such an intermediate zone and passed through the intermediate zone over a predetermined period. When the time to pass the film through the intermediate zone falls below 0.5 second, hot air in the transverse stretching zone flows into a heat-setting zone by the accompanying flow of the film that passes, making it difficult to control the temperature of the intermediate heat treatment in the heat-setting zone, so that the case is unpreferred. Oppositely, a period of at most 3.0 seconds is sufficient for passing the film through the intermediate zone. Setting the time to be longer than that is waste of equipment, whereby the case is unpreferred. The lower limit of the time to pass the film through the intermediate zone is preferably 0.7 second or more, more preferably 0.9 second or more. The upper limit of the time to pass the film through the intermediate zone is preferably 2.5 seconds or less, more preferably 2.0 seconds or less.

(3) Trimming of Film End Prior to Stretching in Longitudinal Direction

In the manufacture of a film by the transverse-lengthwise stretching method of the present invention, before the film having been subjected to the intermediate heat treatment is stretched in the longitudinal direction, a thick portion not sufficiently subjected to transverse stretching in the film edge area (mainly, a clip gripping portion during transverse stretching) is preferably trimmed. More specifically, in a portion of a thickness of from about 1.1 to 1.3 times the thickness in the central portion, located on right and left edge areas of the film, a thick portion of the film edge area is cut using a tool such as a cutter. Only the remaining portion is preferably stretched in the longitudinal direction while the thick portion is removed. In addition, when the film end is trimmed as described above, a film before being subjected to trimming is preferably cooled in advance such that the surface temperature is 50° C. or less. Cooling the film in such a manner makes it possible to trim the cutting face without disturbance. Moreover, although the film end can be trimmed using a usual cutter or the like, use of a round blade having a circular cutting edge permits the film end to be sharply and continuously cut over a long period of time without partially dulling the cutting edge. This causes no induction of rupture during stretching to the longitudinal direction and thus is preferable.

Trimming of the end of the film prior to stretching in the longitudinal direction in such a way renders it possible to uniformly stretch a once heat-set film in the longitudinal direction. Now, for the first time, a continuous stable production of a film without rupture becomes possible. Additionally, it becomes possible to obtain a film with a large amount of shrinkage in the longitudinal direction (main shrinkage direction). Furthermore, uniform stretching of a film in the longitudinal direction is possible, so that a film having a small thickness unevenness in the longitudinal direction can be obtained. In addition, the trimming of the film end enables bowing during stretching in the longitudinal direction to be avoided to thereby obtain a film exhibiting a small physical property difference of the right and left. The stretching in the longitudinal direction needs to be executed such that the temperature is Tg+5° C. or more and Tg+80° C. or less and that the ratio is 2.0 times or more and 7.0 times or less by a method of making use of a longitudinal stretching machine in which a plurality of roll groups are continuously arranged (a method in which stretching is executed by utilizing the speed difference of the rolls), or the like.

(4) Control of Cooling Rate of Film after Longitudinal Stretching

In manufacture of the film by the transverse-lengthwise stretching method of the present invention, it is preferred that, as described above, the film is subjected to the intermediate heat treatment after transverse stretching and then is stretched in the longitudinal direction and subsequently cooled at a cooling rate of 30° C./second or more and 75° C./second or less until the surface temperature becomes 45° C. or more and 75° C. or less. The natural shrinkage ratio can be reduced only by cooling the film at an adequate speed. Such cooling that the cooling rate falls below 30° C./second or that the surface temperature after cooling exceeds 75° C. is unpreferred since a low natural shrinkage ratio is not obtained. Oppositely, such rapid cooling that the cooling rate exceeds 70° C./second increases the extent of the shrinkage of the film in the width direction (so-called neck in) and is liable to scratch the film surface, so that the case is unpreferred.

It is considered that not only specific one of the techniques (1) to (4) described above effectively contributes to the heat shrinkability in the longitudinal direction, perforated line openability, low natural shrinkage ratio and stable film formability of the film, but also the use of the combination of the techniques (1) to (4) can very effectively exhibit the heat shrinkability in the longitudinal direction, perforated line openability, low natural shrinkage ratio and stable film formability of the film.

EXAMPLES

Hereinafter, the present invention will be described in more detail by way of examples; however, the invention is by no means limited to aspects of such examples and can be properly modified within the invention. The properties and compositions of starting materials used in examples and comparative examples, and the manufacturing conditions of the films (stretching and heat treatment conditions and the like) in examples and comparative examples are each shown in Tables 1 and 2

TABLE 1

| | Composition, properties of resin starting material | | |
|---|---|---|---|
| | Resin composition | Total of monomer components that is amorphous components (mol %) | Melting point of film (° C.) |
| Example 1 | Polyester 1:Polyester 2 = 90:10 | 27 | Not observed |
| Example 2 | Polyester 1:Polyester 2 = 70:30 | 21 | Not observed |
| Example 3 | Polyester 1:Polyester 2 = 90:10 | 27 | Not observed |
| Example 4 | Polyester 1:Polyester 2 = 90:10 | 27 | Not observed |
| Example 5 | Polyester 1:Polyester 2 = 90:10 | 27 | Not observed |
| Example 6 | Polyester 1:Polyester 2 = 90:10 | 27 | Not observed |
| Example 7 | Polyester 1:Polyester 2 = 90:10 | 27 | Not observed |
| Example 8 | Polyester 4:Polyester 2 = 90:10 | 27 | Not observed |
| Example 9 | Polyester 1:Polyester 2 = 90:10 | 27 | Not observed |
| Comparative Example 1 | Polyester 3 | 17.5 | 217 |
| Comparative Example 2 | Polyester 1:Polyester 2 = 40:60 | 12 | Not observed |
| Comparative Example 3 | Polyester 1:Polyester 2 = 90:10 | 27 | Not observed |
| Comparative Example 4 | Polyester 1:Polyester 2 = 90:10 | 27 | Not observed |
| Comparative Example 5 | Polyester 3 | 17.5 | 217 |

TABLE 2

| | | Stretching conditions | | | | | |
|---|---|---|---|---|---|---|---|
| | Stretching method | First stretching | | | Time to pass film through intermediate zone (sec.) | Intermediate treatment (heat treatment after uniaxial stretching) | |
| | | Direction | Temp. (° C.) | Ratio | | Temp. (° C.) | Time (sec.) |
| Example 1 | Transverse-Lengthwise | Transverse | 75 | 4 | 1.2 | 130 | 2 |
| Example 2 | Transverse-Lengthwise | Transverse | 75 | 4 | 1.2 | 130 | 2 |
| Example 3 | Transverse-Lengthwise | Transverse | 75 | 5 | 1.2 | 130 | 2 |
| Example 4 | Transverse-Lengthwise | Transverse | 75 | 4 | 1.2 | 140 | 2 |
| Example 5 | Transverse-Lengthwise | Transverse | 75 | 4 | 1.2 | 130 | 2 |
| Example 6 | Transverse-Lengthwise | Transverse | 75 | 4 | 1.2 | 130 | 2 |
| Example 7 | Transverse-Lengthwise | Transverse | 75 | 4 | 1.2 | 130 | 2 |
| Example 8 | Transverse-Lengthwise | Transverse | 75 | 4 | 1.2 | 130 | 2 |
| Example 9 | Transverse-Lengthwise | Transverse | 75 | 4.5 | 1.2 | 130 | 2 |
| Comparative Example 1 | Lengthwise-Transverse-Lengthwise | Lengthwise | 88 | 2.7 | No intermediate zone | Not carried out | |
| Comparative Example 2 | Transverse-Lengthwise | Transverse | 75 | 4 | 1.2 | 130 | 2 |
| Comparative Example 3 | Transverse-Lengthwise | Transverse | 75 | 4 | 1.2 | 70 | 2 |
| Comparative Example 4 | Transverse | Transverse | 75 | 4 | 1.2 | Not carried out | |
| Comparative Example 5 | Lengthwise-Transverse-Lengthwise | Lengthwise | 88 | 2.7 | No intermediate zone | Not carried out | |

| | Stretching conditions | | | | | | |
|---|---|---|---|---|---|---|---|
| | Second stretching | | | Heat treatment temp. after second stretching (° C.) | Temp./ratio of lengthwise re-stretching | Cooling rate after stretching (° C./sec.) | Final heat treatment temp. (° C.) |
| | Direction | Temp. (° C.) | Ratio | | | | |
| Example 1 | Lengthwise | 95 | 3 | Not carried out | No lengthwise re-stretching | 45 | 95 |
| Example 2 | Lengthwise | 95 | 3 | Not carried out | No lengthwise re-stretching | 45 | 95 |
| Example 3 | Lengthwise | 95 | 3 | Not carried out | No lengthwise re-stretching | 45 | 95 |
| Example 4 | Lengthwise | 95 | 3 | Not carried out | No lengthwise re-stretching | 45 | 95 |
| Example 5 | Lengthwise | 92 | 5 | Not carried out | No lengthwise re-stretching | 45 | 95 |
| Example 6 | Lengthwise | 92 | 7 | Not carried out | No lengthwise re-stretching | 45 | 95 |
| Example 7 | Lengthwise | 95 | 1.5 | Not carried out | No lengthwise re-stretching | 45 | 95 |
| Example 8 | Lengthwise | 95 | 1.5 | Not carried out | No lengthwise re-stretching | 45 | 95 |
| Example 9 | Lengthwise | 95 | 1.5 | Not carried out | No lengthwise re-stretching | 45 | 95 |
| Comparative Example 1 | Transverse | 97 | 3.5 | 125 | 98° C./1.5 times | 25 | 85 |
| Comparative Example 2 | Lengthwise | 95 | 3 | Not carried out | No lengthwise re-stretching | 45 | 95 |
| Comparative Example 3 | Lengthwise | 95 | 3 | Not carried out | No lengthwise re-stretching | 45 | 95 |
| Comparative Example 4 | Not carried out | | | Not carried out | No Lengthwise re-stretching | 20 | No heat treatment |
| Comparative Example 5 | Transverse | 97 | 3.5 | 125 | 98° C./3.0 times | 25 | 85 |

The evaluation methods of films are as follows.

[Tg (Glass Transition Point)]

Tg was obtained from the resulting endothermic curve by heating 5 mg of an unstretched film from −40° C. to 120° C. at a rising rate of temperature of 10° C./minute using a differential scanning calorimeter manufactured by Seiko Instruments Inc. (Model: DSC 220). A tangent line was drawn in front of and behind the inflection point of the endothermic curve, and the intersection was taken as Tg (glass transition point).

[Tm (Melting Point)]

Tm was obtained from the peak temperature of an endothermic curve when 5 mg of an unstretched film was collected and heated from room temperature at a rising rate of temperature of 10° C./minute using a differential scanning calorimeter manufactured by Seiko Instruments Inc. (Model: DSC 220).

[Heat Shrinkage Ratio (Hot-Water Heat Shrinkage Ratio)]

A film was cut into a square of 10 cm×10 cm and treated in hot water at a predetermined temperature of ±0.5° C. for 10 seconds in an unloaded state and heat-shrunk. Thereafter, the dimensions of the film in the lengthwise and transverse directions were measured and then each heat shrinkage ratio was calculated according to Equation 1 above. The direction larger in the heat shrinkage ratio was taken as the main shrinkage direction.

[Maximum Value of Heat Shrinkage Stress]

The stretched film was cut into a size of the main shrinkage direction×the direction orthogonal to the main shrinkage direction=200 mm×15 mm. Thereafter, a universal tensile strength tester STM-50 manufactured by Baldwin was adjusted to a temperature of 90° C. and the cut film was set therein and then the stress value when the film was held for 10 seconds was determined.

[Refractive Indexes in Longitudinal Direction and Width Direction]

Each sample film was left to stand at 23° C. and 65% RH for 2 hours or more and measured using "Abbe Refractometer Model 4T" manufactured by ATAGO Co., Ltd.

[Natural Shrinkage Ratio]

The resulting film was cut into a size of main shrinkage direction×orthogonal direction=200 mm×30 mm. This film was left to stand under an atmosphere of 40° C.×65% RH for 700 hours (aging) and then the amount of shrinkage was determined in the main shrinkage direction of the film (the longitudinal direction in Examples 1 to 9 and Comparative Examples 1 to 3 and 5, and the width direction in Comparative Example 4). From this amount, the natural shrinkage ratio was calculated by Equation 4.

[Elmendorf Ratio]

The resulting film was attached to a rectangular frame while having been loosened in advance (both ends of the film were held by the frame). Then, the film was shrunk by 10% in the main shrinkage direction (hereinafter, called preliminary shrinkage) by immersing the film in hot water at 80° C. for about 5 seconds until the loosened film comes into a state of tension in the frame (until the sag is lost). Thereafter, according to JIS-K-7128, the film was cut into a size of main shrinkage direction×orthogonal direction=75 mm×63 mm and a test piece was prepared by making a slit of 20 mm (depth of cut) so as to be orthogonal to a long edge (edge along the main shrinkage direction) from the center of the edge. Then, the Elmendorf tear load in the orthogonal direction was measured using the test piece fabricated. In addition, the film was preliminarily shrunk in the main shrinkage direction by a method similar to the above method. Thereafter, the main shrinkage direction of the film was replaced by the orthogonal direction and a test piece was prepared and then the Elmendorf tear load in the main shrinkage direction was measured. Then, the Elmendorf ratio was calculated by using Equation 3 above from the resulting Elmendorf tear loads in the main shrinkage direction and the direction orthogonal to the main shrinkage direction.

[Right Angle Tear Strength]

A film was shrunk by 10% in the main shrinkage direction in hot water adjusted to 80° C. Thereafter, a test piece was made by sampling the film into a shape shown in FIG. 1 according to JIS-K-7128 (in sampling, the longitudinal direction of the test piece was taken as the main shrinkage direction of the film). Thereafter, both ends of the test piece were gripped with a universal tensile strength tester (autograph manufactured by Shimadzu Corp.) and the strength at the tensile fracture in the width direction of the film was measured at a tensile rate of 200 mm/minute and then the right angle tear strength per unit thickness was calculated using Equation 2 above.

[Main Shrinkage Direction Thickness Unevenness]

A film was sampled into a long roll shape of length 30 m×width 40 mm and then was measured at a rate of 5 (m/min) using a continuous contact thickness gauge. In the sampling of the above-mentioned roll-formed film sample, the longitudinal direction of the film sample was taken as the main shrinkage direction of the film. In the measurement, the maximum thickness is Tmax. the minimum thickness is Tmin. and the average thickness is Tave. And the longitudinal thickness unevenness of the film was calculated from Equation 5 below:

$$\text{Thickness unevenness} = \{(T_{max} - T_{min})/T_{ave}\} \times 100(\%) \qquad \text{Equation 5}$$

[Solvent Adhesion Strength]

To the stretched films, 1,3-dioxolane was applied and two pieces were stuck together for sealing. Thereafter, the seal portion was cut into a piece with a width of 15 mm in a direction orthogonal to the main shrinkage direction of the film (hereinafter, called the orthogonal direction). The piece was set in a universal tensile strength tester STM-50 manufactured by Baldwin and then a peel test at 180° was executed at a tensile rate of 200 mm/minute. The tensile strength at that time was taken as the solvent adhesion strength.

[Finish Properties after Shrinkage (Cylindrical Body Fitting)]

Three-color printing was applied in advance to a heat-shrinkable film with dark green, gold and white inks manufactured by Toyo Ink Mfg. Co., Ltd. Then, a cylindrical label (cylindrical label in which the main shrinkage direction of the heat-shrinkable film is the circumferential direction and the outer circumferential length is 1.05 times the outer circumferential length of the bottle for attachment) was prepared by affixing both ends of the printed film with dioxolane. Thereafter, a 500 ml PET bottle (trunk diameter: 62 mm, minimum diameter of the neck portion: 25 mm) was covered with the cylindrical label, which was attached thereto by heat shrinking for a transit time of 2.5 seconds at a temperature of the zone of 80° C. using a steam tunnel manufactured by Fuji Astec Inc (Model: SH-1500-L). Upon attachment, in the neck portion, a portion with a diameter of 40 mm was adjusted to become one end of the label. Finish properties after shrinkage were visually evaluated, and the criteria were as follows.

Excellent: No wrinkles, jumping up and shrinkage shortage occur and no colored spots are seen as well Good: No wrinkles, jumping up and shrinkage shortage can be ascertained, but some colored spots are seen Fair: No jumping up and shrinkage shortage occur, but unevenness in the neck portion are seen Poor: Wrinkles, jumping up and shrinkage shortage occur

[Finish Properties after Shrinkage (Wraparound)]

Three-color printing was applied to a heat-shrinkable film with dark green, gold and white inks manufactured by Toyo Ink Mfg. Co., Ltd. The heat-shrinkable film after the printing was cut into a piece in a size of length 230 mm×width 100 mm such that the longitudinal direction is lengthwise. Then, the film was fixed to a 265 ml aluminum bottle can (trunk diameter: 68 mm, minimum diameter of the neck portion: 25 mm, the bottle provided with a "constriction" so that the diameter of the center of the trunk is 60 mm) by applying in dot form an active energy ray (UV) curing adhesive produced by the method described below to three portions of the top, bottom and center of the edge area on the bottle can contact face side of the short side of the film, while the film was wound around the aluminum bottle can such that one of the long sides of the cut film was along the bottom of the can, with the aluminum bottle can being stood. Next, a similar active energy ray curing adhesive was applied to the other edge area of the film that was wound therearound such that the other edge area was superimposed, with a width of 5 mm, on the edge area that was previously fixed to the bottle, and the adhesive layer applied to the other edge area was sandwiched therebetween. Thereafter, immediately, the adhesive portion (portion where the edge areas of the film overlapped mutually) was irradiated with an ultraviolet ray with a 3 kW (120 W/cm) one-light air-cooled mercury lamp such that the intensity of the ultraviolet ray was 100 mJ/cm$^2$ to adhere the both ends of the film by curing and to thereby produce a bottle can with a heat-shrinkable label. Subsequently, the bottle with the heat-shrinkable label after label attachment was immediately sent to a steam furnace shrink tunnel of a length of 3 m kept at 92° C. and passed therethrough over 10 seconds to thereby shrink and stick the label onto the outer circumference of the bottle can. Upon attachment of the film, a portion with a diameter of 40 mm in the neck portion was adjusted to become one end of the label. Thereafter, the finish properties after shrinking were visually evaluated using the following 4 levels.

Excellent: No wrinkles, jumping up and shrinkage shortage occur and no colored spots are seen as well Good: No wrinkles, jumping up and shrinkage shortage can be ascertained, but some colored spots are seen Fair: No jumping up and shrinkage shortage occur, but unevenness in the neck portion are seen Poor: Wrinkles, jumping up and shrinkage shortage occur <Method of Manufacturing Active Energy Ray (UV) Curing Adhesive>

In a reaction vessel equipped with a thermometer, a stirrer, a distillation column, a condenser and a pressure reducing device were placed 440 parts of dimethyl terephthalate, 440 parts of dimethyl isophthalate, 412 parts of ethylene glycol, 393 parts of hexanediol and 0.5 part of tetrabutoxy titanate and the materials were heated for 120 minutes at 150 to 230° C. for ester exchange reaction. Next, the pressure of the reaction system was reduced to 10 mmHg, and then a reaction was carried out while increasing the temperature to 250° C. over 30 minutes. Copolymerized polyester polyol was obtained. The molecular weight of the polyester polyol was 1600. Next, 100 parts of copolymerized polyester polyol and 120 parts of phenoxy ethyl acrylate were placed in a reaction vessel equipped with a thermometer, a stirrer and a reflux condenser. After dissolution, 15 parts of isophorone diisocyanate and 0.05 part of dibutyl tin dilaurate were placed therein and reacted at 70 to 80° C. for 2 hours. Thereafter, further 5 parts of 2-hydroxyethyl acrylate was added thereto and reacted at 70 to 80° C. A phenoxy ethyl acrylate solution of a urethane acrylate resin was obtained. Immediately before use of 100 parts of this solution, 3 parts by mass of 2-hydroxy-2-methyl-1-phenyl-propane-1-one (Darocure (registered trademark) 1173: manufactured by Ciba Specialty Chemicals Co., Ltd.) was added as a photopolymerization initiator. An active energy ray (UV) curing adhesive was obtained. The molecular weight of the urethane acrylate was 2000. The compositions of the adhesives are summarized in Table 3. The above-mentioned molecular weight is a number average molecular weight and is a result (in terms of polystyrene) determined by using tetrahydrofuran as an eluant and using GPC150c (manufactured by Waters Corporation). During measurement, the column temperature was set at 35° C. and the flow rate at 1 ml/minute.

[Label Adhesion Property]

A label was attached onto a PET bottle under the same conditions as the measurement conditions of the finish properties after shrinkage (cylindrical body fitting) as described above. Then, when the attached label and the PET bottle were lightly twisted, the label was evaluated as good if the label was not moved, and if the label came off or the label and the bottle shifted, the label was evaluated as poor (additionally, when a film is directly wound around a PET bottle or the like and attached thereonto by the wraparound system, the edge of the film is bonded to the PET bottle, so that the label adhesion property do not matter).

[Perforated Line Openability]

A label provided with a perforated line orthogonal direction to the main shrinkage direction in advance was attached onto a PET bottle under the same conditions as the measurement conditions of the finish properties after shrinkage (cylindrical body fitting) as described above. Here, the perforated lines were formed by punching holes with a length of 1 mm at 1 mm intervals and two perforated lines were provided over a width of 22 mm and a length of 120 mm in the lengthwise direction (direction of height) of the label. Thereafter, this bottle was filled with 500 ml of water and was refrigerated at 5° C. The perforated line of the label of the bottle immediately after being taken out from the refrigerator was torn with the tip of a finger. The number of bottles at which the label was successfully torn along the perforated lines in the lengthwise direction and peeled off the bottle was counted. The ratio (%) of the number of bottles to the total sample number of 50 was calculated.

[Comprehensive Evaluation]

Finish properties after shrinkage (cylindrical body fitting), finish properties after shrinkage (wraparound), label adhesion property and perforated line openability were evaluated as stated above. As a result, a heat-shrinkable film was regarded as good if the film was practically usable in either the cylindrical body fitting system (method of forming a cylindrical label in advance in which the circumferential direction is the main shrinkage direction and then fitting the label onto a PET bottle or the like and attaching) or the wraparound system (method of directly winding a film around a PET bottle or the like such that the main shrinkage direction of the film is the circumferential direction and attaching), and a heat-shrinkable film was regarded as poor if the film was practically unusable in both the cylindrical body fitting system and the wraparound system.

The polyesters used for examples and comparative examples are as follows.

Polyester 1: polyester constituting 70% by mole of ethylene glycol, 30% by mole of neopentyl glycol and terephthalic acid (IV 0.72 dl/g)

Polyester 2: polyethylene terephthalate (IV 0.75 dl/g)

Polyester 3: constituting 82.5% by mole of a terephthalic acid and 17.5% by mole of an isophthalic acid unit as dicarboxylic acid components and ethylene glycol as a diol component.

Polyester 4: polyester constituting 70% by mole of ethylene glycol, 30% by mole of 1,4-cyclohexane dimethanol and terephthalic acid (IV 0.75 dl/g)

Example 1

Polyester 1 and polyester 2 as described above were mixed in the weight ratio 90:10 and the resulting material was introduced into an extruder. Thereafter, the mixed resin was molten at 280° C. and extruded from a T-die and then quenched by winding it around a rotating metal roll set at a surface temperature of 30° C. An unstretched film with a thickness of 360 μm was obtained. The take-off speed (rotational speed of the metal roll) of the unstretched film at this time was about 20 m/min. Moreover, the Tg of the unstretched film was 67° C. Thereafter, the unstretched film was led to a tenter (first tenter) in which a transverse stretching zone, an intermediate zone and an intermediate heat treatment zone were continuously disposed. In the tenter, the length of the intermediate zone located intermediately between the transverse stretching zone and the intermediate heat treatment zone was set at about 40 cm. Additionally, in the intermediate zone, when a strip of paper was hung down without passing a film, hot air from the stretching zone and hot air from the heat treatment zone were interrupted such that the paper strip hangs down almost completely in the lengthwise direction.

Then, the unstretched film led to the tenter was preliminary heated until the temperature of the film became 90° C. Thereafter, the film was stretched four times at 75° C. in the transverse direction in the transverse stretching zone and passed through the intermediate zone (transit time about 1.2 seconds). Then, the film was led to the intermediate heat treatment zone and heat-treated at a temperature of 130° C. over 2.0 seconds. A transverse uniaxially stretched film with a thickness of 90 μm was obtained. Subsequently, one pair of trimming devices (including a round blade having a circular cutting edge) in right and left sides disposed behind the tenter were utilized to cut the edge area of the transverse uniaxially stretched film (part about 1.2 times the film thickness at the center) and to continuously remove the end of the film positioned outside the cut portion.

Furthermore, the film whose end was trimmed in such a manner was led to a lengthwise stretching machine in which a plurality of roll groups are continuously arranged and was preliminarily heated until the film temperature was 70° C. on a preheat roll and then stretched 3 times between stretching rolls set at a surface temperature of 95° C. Thereafter, the lengthwise stretched film was forcibly cooled by a cooling roll set at a surface temperature of 25° C. The surface temperature of the film prior to cooling was about 75° C., and the surface temperature of the film after cooling was about 25° C. Additionally, the time required to cool the film from 70° C. to 25° C. was about 1.0 second and the cooling rate of the film was 45° C./second.

Then, the film after cooling was led to a tenter (second tenter) and heat-treated under an atmosphere of 95° C. over 2.0 seconds within the second tenter. Thereafter, the film was cooled and the both edges were cut and removed to thereby continuously form a biaxially stretched film of about 30 μm over a given length. A film roll made of a heat-shrinkable polyester film was obtained. Subsequently, the properties of the resulting film were evaluated by the methods as described above. The evaluation results are shown in Table 3.

Example 2

A heat-shrinkable film was continuously produced by a method similar to the method of Example 1 with the exception that polyester 1 and polyester 2 were mixed in the weight ratio 70:30 and then the resulting material was introduced into an extruder. Then, the properties of the resulting film were evaluated by methods similar to the methods of Example 1. The evaluation results are shown in Table 3.

Example 3

A heat-shrinkable film was continuously produced by a method similar to the method of Example 1 with the exception that the stretch ratio in the transverse direction in the tenter (first tenter) was changed to 5.0 times.

The thickness of the biaxially stretched heat-shrinkable polyester film was about 24 μm. Then, the properties of the resulting film were evaluated by methods similar to the methods of Example 1. The evaluation results are shown in Table 3.

Example 4

A heat-shrinkable film was continuously produced by a method similar to the method of Example 1 with the exception that the temperature of the intermediate heat treatment in the tenter (first tenter) was changed to 140° C. The thickness of the biaxially stretched heat-shrinkable polyester film was about 24 μm. Then, the properties of the resulting film were evaluated by methods similar to the methods of Example 1. The evaluation results are shown in Table 3.

Example 5

A heat-shrinkable film was continuously produced by a method similar to the method of Example 1 with the exception that the temperature of the stretching roll in the lengthwise stretching machine was changed to 92° C. and that the stretch ratio in the longitudinal direction was changed to 5.0 times. The thickness of the biaxially stretched heat-shrinkable polyester film was about 18 μm. Then, the properties of the resulting film were evaluated by methods similar to the methods of Example 1. The evaluation results are shown in Table 3.

Example 6

A heat-shrinkable film was continuously produced by a method similar to the method of Example 1 with the exception that the temperature of the stretching roll in the lengthwise stretching machine was changed to 92° C. and that the stretch ratio in the longitudinal direction was changed to 7.0 times. The thickness of the biaxially stretched heat-shrinkable polyester film was about 13 μm. Then, the properties of the resulting film were evaluated by methods similar to the methods of Example 1. The evaluation results are shown in Table 3.

Example 7

A heat-shrinkable film was continuously produced by a method similar to the method of Example 1 with the exception that the stretch ratio in the longitudinal direction in the lengthwise stretching machine was changed to 1.5 times. The thickness of the biaxially stretched heat-shrinkable polyester film was about 60 μm. Then, the properties of the resulting film were evaluated by methods similar to the methods of Example 1. The evaluation results are shown in Table 3.

Example 8

A heat-shrinkable film was continuously produced by a method similar to the method of Example 1 with the exception that the raw material resin to be introduced into the extruder was changed to a material in which polyester 4 and polyester 2 were mixed in the weight ratio 90:10 and that the stretch ratio in the longitudinal direction in a lengthwise stretching machine was changed to 1.5 times. The thickness of the biaxially stretched heat-shrinkable polyester film was about 60 μm. Then, the properties of the resulting film were evaluated by methods similar to the methods of Example 1. The evaluation results are shown in Table 3.

Example 9

A heat-shrinkable film was continuously produced by a method similar to the method of Example 1 with the exception that the stretch ratio in the transverse direction in the tenter (first tenter) was changed to 4.5 times and that the stretch ratio in the longitudinal direction in the lengthwise stretching machine was changed to 1.5 times. The thickness of the biaxially stretched heat-shrinkable polyester film was about 27 μm. Then, the properties of the resulting film were evaluated by methods similar to the methods of Example 1. The evaluation results are shown in Table 3.

Comparative Example 1

Polyester 3 as described above was introduced into an extruder and molten at 265° C. and extruded from a T-die and then quenched by winding it around a rotating metal roll set at a surface temperature of 30° C. An unstretched film with a thickness of 360 μm was obtained. The take-off speed of the unstretched film was set as in Example 1. Thereafter, the unstretched film was led to a lengthwise stretching machine in which a plurality of roll groups are continuously arranged (first lengthwise stretching machine) and was preliminarily heated on a preheat roll and then stretched 2.7 times between stretching rolls set at a surface temperature of 88° C. Further, the film stretched in the longitudinal direction was led to a tenter (first tenter) in which a transverse stretching zone and a heat treatment zone were continuously disposed and stretched 3.5 times at 97° C. to the transverse direction at a stretching temperature of 97° C. in the transverse stretching zone, and then heat-treated at 125° C. in the heat treatment zone. Thereafter, the film after heat treatment was led to a lengthwise stretching machine in which a plurality of roll groups are continuously arranged (second lengthwise stretching machine) and was preliminarily heated on a preheat roll and then lengthwise re-stretched 1.5 times between stretching rolls set at a surface temperature of 98° C. Further, the lengthwise re-stretched film was led to a tenter (second tenter) and heat-treated at 85° C. and cooled and then the both edges were cut and removed to thereby continuously form a biaxially stretched film of about 35 μm over a given length. A film roll made of a heat-shrinkable polyester film was obtained. The surface temperature of the film after heat treatment and before cooling was about 75° C., and the film was cooled to about 25° C. in about 2.0 seconds (cooling rate=25° C./second). Subsequently, the properties of the resulting film were evaluated by the methods as described above. The evaluation results are shown in Table 3.

Comparative Example 2

A heat-shrinkable film was continuously produced by a method similar to the method of Example 1 with the exception that polyester 1 and polyester 2 were mixed in the weight ratio 40:60 and then the resulting material was introduced into the extruder The thickness of the biaxially stretched heat-shrinkable polyester film was about 13 μm. Then, the properties of the resulting film were evaluated by methods similar to the methods of Example 1. The evaluation results are shown in Table 3.

Comparative Example 3

A heat-shrinkable film was continuously produced by a method similar to the method of Example 1 with the exception that the temperature of the intermediate heat treatment in the tenter (first tenter) was changed to 70° C. Then, the properties of the resulting film were evaluated by methods similar to the methods of Example 1. The evaluation results are shown in Table 3.

Comparative Example 4

An unstretched film was led to the tenter and preliminarily heated until the film temperature became 90° C. Thereafter, the film was stretched 4.0 times at a stretching temperature of 75° C. in the transverse direction and cooled and the both edges were cut and removed to thereby continuously form a uniaxially stretched film of about 45 μm over a given length. A heat-shrinkable polyester film roll was obtained. The surface temperature of the film after heat treatment and before cooling was about 75° C., and the film was cooled to about 35° C. in about 2.0 seconds (cooling rate=20° C./second). Subsequently, the properties of the resulting film were evaluated by the methods as described above. The evaluation results are shown in Table 3. In addition, in the film of Comparative Example 4, the width direction is the main shrinkage direction, and the longitudinal direction is a direction orthogonal to the main shrinkage direction.

Comparative Example 5

A heat-shrinkable film was continuously produced by a method similar to the method of Comparative Example 1 with the exception that the stretch ratio was changed to 3.0 times when the film was lengthwise re-stretched by the second lengthwise stretching machine. Then, the properties of the resulting film were evaluated by methods similar to the methods of Example 1. The evaluation results are shown in Table 3.

TABLE 3

Properties of heat-shrinkable film

| | Hot-water shrinkage ratio (%) | | Maximum value of heat shrinkage stress (MPa) | Refractive index | | Natural shrinkage ratio (%) | Elmendorf tear load (mN) | | Elmendorf ratio |
|---|---|---|---|---|---|---|---|---|---|
| | Main shrinkage direction | Orthogonal direction* | | Main shrinkage direction | Orthogonal direction* | | Main shrinkage direction | Orthogonal direction* | |
| | 80° C. | 90° C. | 90° C. | | | | | | | |
| Example 1 | 35 | 58 | 3 | 7.8 | 1.588 | 1.580 | 0.5 | 260 | 300 | 0.87 |
| Example 2 | 34 | 55 | 7 | 7.1 | 1.592 | 1.578 | 0.5 | 280 | 350 | 0.80 |
| Example 3 | 34 | 58 | 4 | 7.3 | 1.585 | 1.583 | 0.5 | 270 | 290 | 0.93 |
| Example 4 | 32 | 62 | 0 | 7.1 | 1.589 | 1.580 | 0.5 | 260 | 300 | 0.87 |
| Example 5 | 38 | 59 | 7 | 8.5 | 1.593 | 1.576 | 0.8 | 220 | 320 | 0.69 |
| Example 6 | 42 | 69 | 10 | 8.5 | 1.599 | 1.571 | 1.0 | 200 | 350 | 0.57 |
| Example 7 | 17 | 29 | 2 | 3.9 | 1.577 | 1.585 | 0.5 | 340 | 260 | 1.31 |
| Example 8 | 16 | 30 | 1 | 3.2 | 1.578 | 1.584 | 0.5 | 355 | 372 | 0.95 |
| Example 9 | 15 | 28 | 6 | 3.3 | 1.581 | 1.602 | 0.5 | 324 | 240 | 1.35 |
| Comparative Example 1 | 19 | 26 | 9 | 4.9 | — | — | 1.8 | 300 | 640 | 0.47 |
| Comparative Example 2 | 32 | 50 | 19 | 5.1 | 1.590 | 1.576 | 0.6 | 350 | 400 | 0.88 |
| Comparative Example 3 | 30 | 51 | 22 | 7.3 | 1.618 | 1.579 | 0.5 | 250 | 370 | 0.67 |
| Comparative Example 4 | 41 | 65 | 3 | 8.7 | 1.625 | 1.555 | 0.6 | 140 | 1650 | 0.08 |
| Comparative Example 5 | 36 | 62 | 19 | 8.2 | — | — | 2.5 | 120 | 850 | 0.14 |

Properties of heat-shrinkable film

| | Right angle tear strength (N/mm) | Solvent adhesion strength (N/15 mm) | Main shrinkage direction thickness unevenness (%) | Finish properties after shrinkage (shrinkage unevenness and the like) | | Label adhesion property (cylindrical body fitting) | Perforated line openability (failure ratio) (%) | Practical comprehensive evaluation |
|---|---|---|---|---|---|---|---|---|
| | | | | Cylindrical body fitting | Wraparound | | | |
| Example 1 | 230 | 6.5 | 6.0 | Excellent | Fair | Good | 6 | Good |
| Example 2 | 250 | 5.4 | 5.2 | Excellent | Fair | Good | 4 | Good |
| Example 3 | 200 | 6.3 | 6.0 | Excellent | Fair | Good | 4 | Good |
| Example 4 | 230 | 6.1 | 6.0 | Excellent | Fair | Good | 2 | Good |
| Example 5 | 250 | 6.8 | 5.0 | Excellent | Fair | Good | 6 | Good |
| Example 6 | 270 | 6.7 | 4.7 | Excellent | Fair | Good | 8 | Good |
| Example 7 | 270 | 6.9 | 17.1 | Poor | Excellent | — | 12 | Good |
| Example 8 | 260 | — | — | Poor | Excellent | — | — | Good |
| Example 9 | 270 | — | — | Poor | Excellent | — | — | Good |
| Comparative Example 1 | 310 | 3.9 | 16.8 | Poor | — | Poor | 20 | Poor |
| Comparative Example 2 | 300 | 4.1 | 7.1 | Poor | Poor | Poor | 6 | Poor |
| Comparative Example 3 | 230 | 6.1 | 7.7 | Poor | Poor | Poor | 18 | Poor |
| Comparative Example 4 | 400 | 6.4 | 8.7 | Excellent | — | Good | 32 | Poor |
| Comparative Example 5 | 340 | 3.5 | 7.8 | Poor | — | Good | 26 | Poor |

Orthogonal direction*Direction orthogonal to the main shrinkage direction (width direction)

As is apparent from Table 3, the films obtained in Examples 1 to 9 were all high in shrinkability in the longitudinal direction that is the main shrinkage direction and very low in shrinkability in the width direction orthogonal to the main shrinkage direction. In addition, the films obtained in Examples 1 to 6 were all high in solvent adhesion strength, good in label adhesion property and had no shrinkage unevenness and good in finish properties after shrinkage (a cylindrical body fitting system). The films obtained in Examples 7 to 9 were good in finish properties after shrinkage (wraparound system). Moreover, the film obtained in Example 7 was high in solvent adhesion strength. Furthermore, the heat-shrinkable polyester films of Examples 1 to 9 were good in perforated line openability as well as small in natural shrinkage ratio and generated no wrinkles in film rolls produced. In other words, the heat-shrinkable polyester films obtained in Examples 1 to 9 were all high in quality as a label and were extremely high in practicality.

On the other hand, the heat-shrinkable film obtained in Comparative Example 1 was poor in label adhesion property and perforated line openability. Both the heat-shrinkable films obtained in Comparative Examples 2 and 3 were high in heat shrinkage ratio in the width direction of the film and poor in label adhesion property, generating shrinkage unevenness. On the other hand, the film obtained in Comparative Example 4 (the main shrinkage direction is the width direction) was poor in perforated line openability though the finish properties after shrinkage (a cylindrical body fitting system) were good. Additionally, the film obtained in Comparative Example 5 was large in heat shrinkage ratio in a direction orthogonal to the main shrinkage direction, generated shrinkage unevenness as well as was poor in perforated line openability, was large in natural shrinkage ratio and wrinkles generated in the film roll produced therefrom. In other words, the heat-shrinkable polyester films obtained in Comparative Examples 1 to 5 were all poor in quality as a label and were low in practicality.

INDUSTRIAL APPLICABILITY

The heat-shrinkable polyester film of the present invention has excellent processing properties as described above, and thus can be suitably used for label applications for bottles.

The invention claimed is:

1. A heat-shrinkable polyester film comprising ethylene terephthalate as a main constituent and containing 10% by mole or more of one or more kind(s) of monomer component(s) that become amorphous component(s) in all polyester resin components, being formed in a long shape with a constant width, and a main shrinkage direction thereof being a longitudinal direction, the heat-shrinkable film satisfying the following requirements (1) to (4):
   (1) the hot-water heat shrinkage ratio in the longitudinal direction is 15% or more and 80% or less when the film is treated in hot water at 90° C. for 10 seconds;
   (2) the hot-water heat shrinkage ratio in a width direction orthogonal to the longitudinal direction is 0% or more and 17% or less when the film is treated in hot water at 90° C. for 10 seconds;
   (3) the refractive indexes in the longitudinal direction and the width direction are both 1.570 or more and 1.620 or less; and
   (4) the natural shrinkage ratio in the main shrinkage direction after aging at 40° C. and 65% RH for 700 hours is 0.05% or more and 1.5% or less.

2. The heat-shrinkable polyester film according to claim 1, wherein the hot-water heat shrinkage ratio in the longitudinal direction is 15% or more and less than 40% when the film is treated in hot water at 90° C. for 10 seconds, the refractive index in the longitudinal direction is 1.570 or more and 1.590 or less, and the refractive index in the width direction is 1.570 or more and 1.620 or less.

3. The heat-shrinkable polyester film according to claim 1, wherein the main component of the monomer(s) that become amorphous component(s) in all the polyester resin components is any one of neopentyl glycol, 1,4-cyclohexane dimethanol and isophthalic acid.

4. The heat-shrinkable polyester film according to claim 1, wherein the Elmendorf ratio is 0.15 or more and 1.5 or less when the Elmendorf tear loads in the longitudinal direction and the width direction are measured after the film is shrunk by 10% in the longitudinal direction in hot water at 80° C.

5. The heat-shrinkable polyester film according to claim 1, wherein the right angle tear strength in the width direction per unit thickness after the film is shrunk by 10% in the longitudinal direction in hot water at 80° C. is 100 N/mm or more and 300 N/mm or less.

6. A method for continuously manufacturing the heat-shrinkable polyester film according to claim 1, comprising stretching an unstretched film at a ratio of 2.5 times or more and 6.0 times or less to the width direction at a temperature of Tg+5° C. or more and Tg+40° C. or less while holding both ends in the width direction using a clip within a tenter, passing the film in an intermediate zone that does not execute an active heating operation, heat-treating the film at a temperature of 100° C. or more and 170° C. or less over a period of 1.0 second or more and 10.0 seconds or less, cooling the film to a surface temperature of 30° C. or more and 70° C. or less, stretching the film at a ratio of 2.0 times or more and 7 times or less in the longitudinal direction at a temperature of Tg+5° C. or more and Tg+80° C. or less, and subsequently cooling the film at a cooling rate of 30° C./second or more and 70° C./second or less to a surface temperature of the film of 45° C. or more and 75° C. or less.

7. The heat-shrinkable polyester film according to claim 2 wherein the main component of the monomer(s) that become amorphous component(s) in all the polyester resin components is any one of neopentyl glycol, 1,4-cyclohexane dimethanol and isophthalic acid.

8. The heat-shrinkable polyester film according to claim 7, wherein the right angle tear strength in the width direction per unit thickness after the film is shrunk by 10% in the longitudinal direction in hot water at 80° C. is 100 N/mm or more and 300 N/mm or less.

9. The heat-shrinkable polyester film according to claim 7, wherein the Elmendorf ratio is 0.15 or more and 1.5 or less when the Elmendorf tear loads in the longitudinal direction and the width direction are measured after the film is shrunk by 10% in the longitudinal direction in hot water at 80° C.

10. The heat-shrinkable polyester film according to claim 9, wherein the right angle tear strength in the width direction per unit thickness after the film is shrunk by 10% in the longitudinal direction in hot water at 80° C. is 100 N/mm or more and 300 N/mm or less.

11. The heat-shrinkable polyester film according to claim 2, wherein the Elmendorf ratio is 0.15 or more and 1.5 or less when the Elmendorf tear loads in the longitudinal direction and the width direction are measured after the film is shrunk by 10% in the longitudinal direction in hot water at 80° C.

12. The heat-shrinkable polyester film according to claim 3, wherein the Elmendorf ratio is 0.15 or more and 1.5 or less when the Elmendorf tear loads in the longitudinal direction and the width direction are measured after the film is shrunk by 10% in the longitudinal direction in hot water at 80° C.

13. The heat-shrinkable polyester film according to claim 2, wherein the right angle tear strength in the width direction per unit thickness after the film is shrunk by 10% in the longitudinal direction in hot water at 80° C. is 100 N/mm or more and 300 N/mm or less.

14. The heat-shrinkable polyester film according to claim 3, wherein the right angle tear strength in the width direction per unit thickness after the film is shrunk by 10% in the longitudinal direction in hot water at 80° C. is 100 N/mm or more and 300 N/mm or less.

15. The heat-shrinkable polyester film according to claim 4, wherein the right angle tear strength in the width direction per unit thickness after the film is shrunk by 10% in the longitudinal direction in hot water at 80° C. is 100 N/mm or more and 300 N/mm or less.

16. A method for continuously manufacturing the heat-shrinkable polyester film according to claim 2, comprising stretching an unstretched film at a ratio of 2.5 times or more and 6.0 times or less to the width direction at a temperature of Tg+5° C. or more and Tg+40° C. or less while holding both ends in the width direction using a clip within a tenter, passing the film in an intermediate zone that does not execute an active heating operation, heat-treating the film at a temperature of 100° C. or more and 170° C. or less over a period of 1.0 second or more and 10.0 seconds or less, cooling the film to a surface temperature of 30° C. or more and 70° C. or less, stretching the film at a ratio of 2.0 times or more and 7 times or less in the longitudinal direction at a temperature of Tg+5°

C. or more and Tg+80° C. or less, and subsequently cooling the film at a cooling rate of 30° C./second or more and 70° C./second or less to a surface temperature of the film of 45° C. or more and 75° C. or less.

17. A method for continuously manufacturing the heat-shrinkable polyester film according to claim 3, comprising stretching an unstretched film at a ratio of 2.5 times or more and 6.0 times or less to the width direction at a temperature of Tg+5° C. or more and Tg+40° C. or less while holding both ends in the width direction using a clip within a tenter, passing the film in an intermediate zone that does not execute an active heating operation, heat-treating the film at a temperature of 100° C. or more and 170° C. or less over a period of 1.0 second or more and 10.0 seconds or less, cooling the film to a surface temperature of 30° C. or more and 70° C. or less, stretching the film at a ratio of 2.0 times or more and 7 times or less in the longitudinal direction at a temperature of Tg+5° C. or more and Tg+80° C. or less, and subsequently cooling the film at a cooling rate of 30° C./second or more and 70° C./second or less to a surface temperature of the film of 45° C. or more and 75° C. or less.

18. A method for continuously manufacturing the heat-shrinkable polyester film according to claim 4, comprising stretching an unstretched film at a ratio of 2.5 times or more and 6.0 times or less to the width direction at a temperature of Tg+5° C. or more and Tg+40° C. or less while holding both ends in the width direction using a clip within a tenter, passing the film in an intermediate zone that does not execute an active heating operation, heat-treating the film at a temperature of 100° C. or more and 170° C. or less over a period of 1.0 second or more and 10.0 seconds or less, cooling the film to a surface temperature of 30° C. or more and 70° C. or less, stretching the film at a ratio of 2.0 times or more and 7 times or less in the longitudinal direction at a temperature of Tg+5° C. or more and Tg+80° C. or less, and subsequently cooling the film at a cooling rate of 30° C./second or more and 70° C./second or less to a surface temperature of the film of 45° C. or more and 75° C. or less.

19. A method for continuously manufacturing the heat-shrinkable polyester film according to claim 5, comprising stretching an unstretched film at a ratio of 2.5 times or more and 6.0 times or less to the width direction at a temperature of Tg+5° C. or more and Tg+40° C. or less while holding both ends in the width direction using a clip within a tenter, passing the film in an intermediate zone that does not execute an active heating operation, heat-treating the film at a temperature of 100° C. or more and 170° C. or less over a period of 1.0 second or more and 10.0 seconds or less, cooling the film to a surface temperature of 30° C. or more and 70° C. or less, stretching the film at a ratio of 2.0 times or more and 7 times or less in the longitudinal direction at a temperature of Tg+5° C. or more and Tg+80° C. or less, and subsequently cooling the film at a cooling rate of 30° C./second or more and 70° C./second or less to a surface temperature of the film of 45° C. or more and 75° C. or less.

* * * * *